United States Patent Office 2,907,114
Patented Oct. 6, 1959

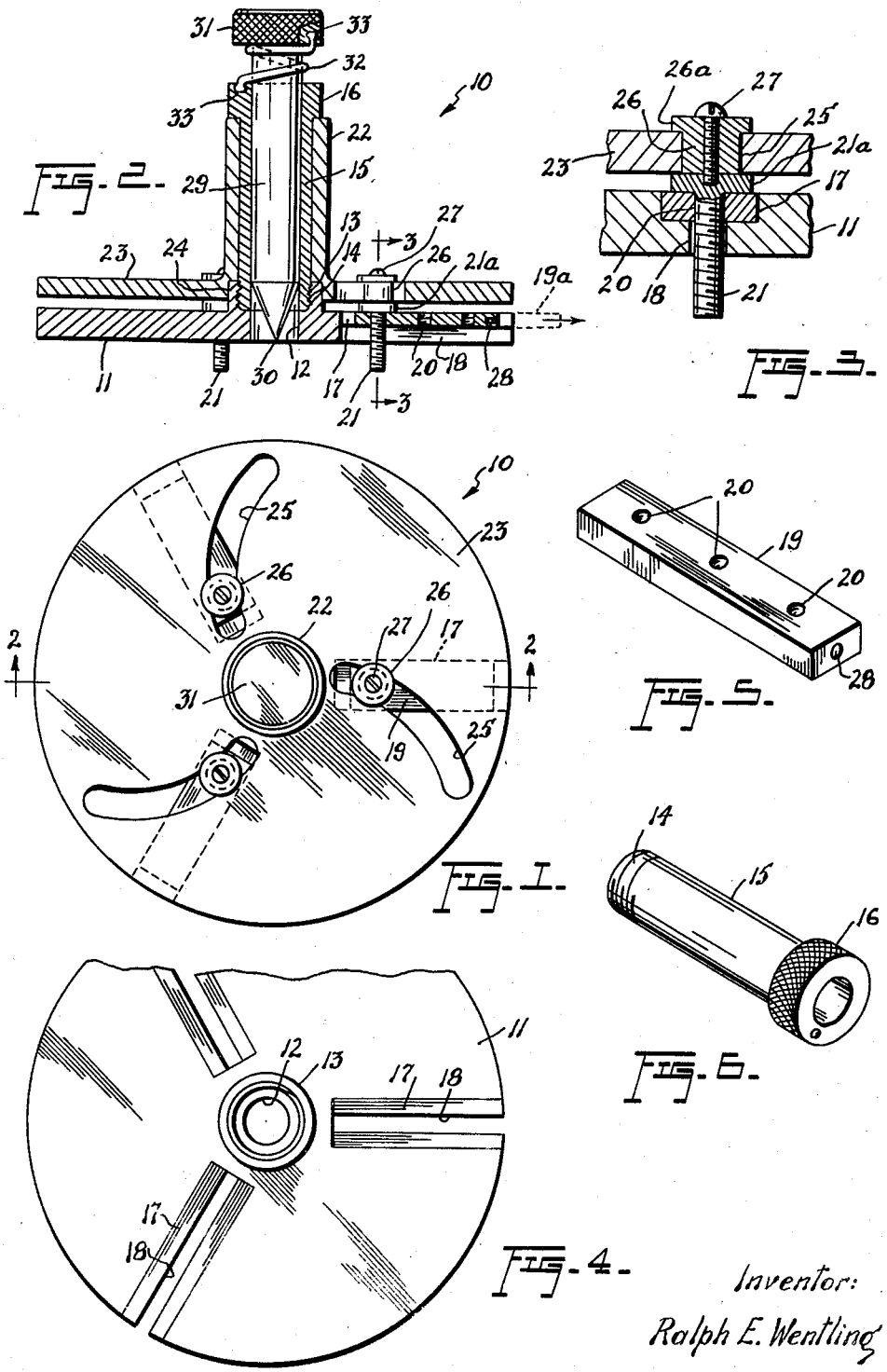

2,907,114

CENTER FINDERS AND PUNCHES

Ralph E. Wentling, Austin, Tex.

Application August 28, 1957, Serial No. 680,725

2 Claims. (Cl. 33—191)

This invention relates to new and useful improvements in center finders for use by machinists, draftsmen, surveyors, pattern makers, and the like, and the principal object of the invention is to facilitate convenient and highly expeditious locating of the center of a piece of work, regardless of the size or shape of the latter.

As such, the invention comprises, broadly, a base plate having a set of locating members slidable radially thereon, together with means for simultaneously sliding such members which are always equidistant from the center of the base plate so that when the locating members are applied to the work, the center of the work lies at the center of the base plate.

An important feature of the invention resides in a novel arrangement of the aforementioned means for simultaneously sliding the locating members, so that their movement is accurately controlled for efficiency of operation.

Another important feature of the invention resides in the provision of a center punch at the center of the base plate, whereby the center of the work may be conveniently marked.

Another important feature of the invention resides in the provision of means for applying the locating members externally as well as internally to the work, so that the device may be used to locate the center on solid objects as well as to locate the center of holes, bores or other openings in the work.

Some of the advantages of the invention reside in its simplicity of construction, in its efficient operation, and in its adaptability to economical manufacture.

With the foregoing more important objects and features in view and such other objects and features as may become apparent as this specification proceeds, the invention will be understood from the following description taken in conjunction with the accompanying drawing, wherein like characters of reference are employed to designate like parts, and wherein:

Figure 1 is a top plan view of the invention;

Figure 2 is a vertical sectional view, taken substantially in the plane of the line 2—2 in Figure 1;

Figure 3 is a fragmentary sectional detail on an enlarged scale, taken substantially in the plane of the line 3—3 in Figure 2;

Figure 4 is a fragmentary top plan view of the base plate and post adapter;

Figure 5 is an isometric view of one of the locating members on an enlarged scale; and Figure 6 is an isometric view of the post used in the invention.

Referring now to the accompanying drawing in detail, the combined center finder and punch is designated generally by the reference numeral 10 and embodies in its construction a circular base plate 11 which is provided at the center thereof with an aperture or opening 12 and with an adapter or boss 13 concentric with the opening 12, as shown in Figure 2. The adapter 13 is counterbored and internally threaded to receive a screw-threaded lower end portion 14 of a tubular post 15, the latter extending upwardly from the base plate 11 and being provided at its upper end with an enlarged head 16.

The base plate 11 is also provided with a plurality of radially extending grooved guideways 17 and with radial slots 18 in the guideways, it being noted that the guideways have open outer ends, and is best shown in Figure 4.

A set of elongated locating members or bars 19 are slidable in the guideways 17, each of these members being formed with a row of screw-threaded apertures 20 to selectively receive screw-threaded elements or studs 21. One of these studs is provided for each of the members 19 and is formed integrally with an enlarged head 21a which abuts the upper surface of the member when the stud is screwed into position. The studs 21 are slidable in the radial slots 18 and project therethrough beyond the lower surface of the base plate 11, as shown.

A tubular sleeve 22 is rotatably positioned on the post 15 and is provided at its lower end with a circular top plate 23, the latter being disposed above the base plate 11, and the center portion of the plate 23 being recessed as shown at 24 to rotatably receive the adapter 13.

The plate 23 is also provided with a plurality of arcuate slots 25 to accommodate rotatable rollers 26, mounted on the heads 21a of the studs 21 by suitable screws 27, or the like. The rollers 26 have flanges 26a at the top thereof which engage the upper surface of the plate 23, it being apparent from the foregoing that the structural arrangement of the various parts is such that they are held in an assembled relation when the threaded portion 14 of the post 15 is screwed into the adapter 13.

When the sleeve 22 is rotated on the post 15, resultant rotation of the top plate 23 with respect to the base plate 11 will cause the rollers 26 to move in the arcuate slots 25, thus sliding the locating members 19 radially inwardly or outwardly in the guideways 17, depending upon the direction in which the sleeve 22 is turned. It is to be noted that the several members 19 are slid simultaneously, and that the studs 21 are equidistant from the center of the base plate. Thus, when the device is applied to the work by engaging the studs 21 with marginal edges of the work, the center of the work will correspond with the center of the base plate and may be readily located as such.

By virtue of the radial movement of the members 19, the studs 21 will accommodate work of various diameters within a certain range, which may be varied by placing the studs selectively in the several of the apertures 20 in the members 19. When the device is to be applied to the work internally rather than externally, such as for example, for locating the center of holes, bores, etc., the members 19 are slid radially outwardly until they project from the open outer ends of the guideways 17 beyond the periphery of the plate 11 and contact the wall of the hole, or the like. If the members 19 are not long enough for this purpose, suitable extensions may be provided thereon as indicated at 19a in Figure 2, these extensions being in the form of rods secured in screw-threaded apertures 28 with which the outer ends of the members are formed.

Means are provided for marking the center on the work when the same is located, these means comprising a center punch 29 which is slidably disposed in the post 15 and has a pointed extremity 30 projectable and retractable through the opening 12 in the base plate 11. The upper end of the punch 29 is provided with an enlarged head 31, and a compression spring 32 is interposed between this head and the upper end of the head 16 of the post 15, whereby to urge the center punch to its retracted position. The punch is prevented from being withdrawn upwardly from the post 15 by the provision of enlarged ends on the spring 32, which are embedded in suitable sockets provided in the heads 16, 31, as shown at 33. When the punch is depressed against the resiliency of the spring, the pointed extremity 30 thereof is projected from the base plate 11 to mark the center of the work, as will be clearly understood.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. A combined center finder and punch, comprising a circular base plate provided with a central opening, a tubular post secured to and extending upwardly from said base plate concentrically with said opening, said base plate being provided in its upper surface with a set of radially extending grooves constituting guideways and also being provided with a set of radially extending slots in the bottom of the respective guideways, said slots being of lesser width than the guideways and disposed centrally therein whereby to provide a pair of radially extending shoulders at the opposite sides of the slot in each guideway, a set of elongated locating members slidable on the shoulders in the respective guideways, said locating members being of substantially the same width and depth as the guideways whereby upper surfaces of the locating members are flush with the upper surface of said base plate, each of the locating members being provided with a plurality of screw-threaded apertures at points spaced differently from the center of the base plate, a set of headed studs receivable selectively in the apertures of the respective locating members and projecting through the respective slots to the underside of the base plate whereby to engage a piece of work, the heads of said studs being disposed above the upper surface of the base plate, a tubular sleeve rotatable on said post, a top plate secured to the lower end of said sleeve and resting on the heads of said studs, guide rollers rotatably mounted on the heads of said studs and operatively engaged in curved slots formed in said top plate whereby to effect sliding of said locating members in said guideways by rotation of said sleeve on said post, a center punch projectably and retractably mounted in said post and said central opening in said base plate, and resilient means for urging said center punch to its retracted position.

2. The device as defined in claim 1 together with an enlarged head provided on said center punch adjacent the upper end of said post, said resilient means comprising a helical spring positioned on the center punch between the upper end of the post and said head, and a pair of enlarged bulbous extremities provided at the opposite ends of said spring, said head and the upper end of said post being formed with sockets having said bulbous extremities anchored therein whereby to prevent withdrawal of the center punch from the post.

References Cited in the file of this patent

UNITED STATES PATENTS

| 578,196 | Beck | Mar. 2, 1897 |
| 589,872 | Stratton et al. | Sept. 14, 1897 |
| 1,219,744 | Keefer | Mar. 20, 1917 |

FOREIGN PATENTS

| 769,915 | France | June 18, 1934 |